UNITED STATES PATENT OFFICE 2,682,467

HIGH PROTEIN MILK PRODUCT

John G. Brereton, Norwich, Francis Algerd Baldauski, South Plymouth, and Donald H. Bornor, Bellport, N. Y., assignors to National Dairy Research Laboratories, Inc., Islip, N. Y., a corporation of Delaware No Drawing. Application January 24, 1950, Serial No. 140,354

11 Claims. (Cl. 99—20)

The present invention relates to a high protein milk product and process of manufacturing such product and embodies, more specifically, an improved product and process of manufacture, wherein an edible non-fat dried milk food product is provided having a high level of milk protein and being susceptible of being reconstituted in milk or water to form a palatable dispersion of high biological value for use, particularly where dietary conditions require substantial amounts of protein, and also to serve as a protein concentrate of high biological value and outstanding solubility and flavor for protein enrichment of other common food products, such as baby cereals, etc.

The dietary value of milk proteins is well known, and they are of importance, not only in the normal diet, but of particularly great importance in the treatment of patients suffering from protein deficiency. At the present time, milk products are available having increased protein content, but their utility is limited because they are either of low solubility or of insufficient protein content, or because they have objectionable odor, flavor, or palatability, and also because they are of relatively high cost.

It is an object of the present invention, accordingly, to provide an improved milk product of high protein content and the process of manufacturing the same, wherein the milk product is readily soluble or dispersible so that it can be easily reconstituted, possesses a relatively high protein content, is relatively inexpensive and is not characterized by a disagreeable or unpleasant odor or flavor, thus being a palatable substance.

The basic idea of the present invention is that advantage can be taken of the natural, well-recognized buffering capacity of milk (either fat-containing or fat-free) towards both alkalies and acids to the extent of causing iso-electric casein to be dispersed or dissolved uniformly and completely in the milk and in such quantity as to permit, in the case of fat-free milk, a final protein content of the milk upon drying of at least 65% as compared with 36% for untreated, fat-free milk powder. This dispersion of casein in milk can be accomplished without the use of alkalies and represents an hitherto, unpracticed method of producing a soluble, high protein milk product. This method of producing a high protein milk is not limited to the use of casein, although this is a protein of choice, but may be used with other protein materials which behave like casein with respect to the ability of such proteins to disperse or dissolve in acids or alkalies. In the instance of casein, either freshly precipitated undried casein or dried, comminuted casein may be used, preference being for the undried casein because of advantages which it offers in terms of flavor to the end product and cost of producing the same. Likewise, the use of natural fluid milk is not necessary since a re-constituted, lyophilized or spray dried, powdered milk will act like fluid milk, insofar as its buffering or protein dispersing power is concerned.

A product made in accordance with the present invention may be formed by causing casein in the desired proportions to be colloidally dispersed in skim milk, this being accomplished, as above described, by utilizing the buffering action of the skim milk. The product is preferably formed by milling a freshly precipitated casein curd using water as a lubricant and until the solids content of the curd is substantially reduced. The foregoing casein may be dissolved in skim milk having the usual solids content of about 8 to 9%, although the efficiency of the operation is increased if the solids content of the skim milk is increased substantially. The casein (which may be in the form of finely divided curd) and skim milk are mixed and pasteurized. The steps of milling to obtain a finely divided curd and of pasteurization serve to facilitate the chemico-physico reaction in which the microscopic curd particles are caused to become colloidally and uniformly dispersed in the milk medium. In the reaction, the alkaline buffering capacity of the milk is consumed to the point that the pH of the milk is lowered from the normal pH value of 6.8 to a value in the range of 5.6 to 6.2, depending on the actual quantity of protein being dispersed and its quality, that is, its freedom from whey impurities. In a typical case of a 60% protein end product, the pH after pasteurization will be about 5.8. Following the pasteurization, the mixture is cooled and then dried to form the desirable end product hereinabove referred to.

The concentration of the skim milk prior to its mixture with the curd reduces the otherwise great volume of skim milk that must be maintained under refrigeration. A further advantage in the concentration of the skim milk prior to its admixture with the curd is that bacterial growth is greatly diminished as a result of pre-concentration of the skim milk. If these factors were not important, the product could be manufactured by mixing the curd and the skim milk without any pre-treatment of the skim milk and, after pasteurization, the product could then be dried as previously mentioned.

In accordance with the present invention, we have discovered a method by means of which casein or casein curd may be effectively dispersed in skim milk without the use of an alkali to facilitate the dispersion, such dispersion being effected, in accordance with our invention, by the chemico-physico action of the buffer elements in the milk on the curd particles, resulting in a uniform, colloidal suspension of the curd in the milk. The rapidity of dispersion of the curd may be increased by reducing the particle size of the curd, in the presence of water as a lubricant, prior to dispersion. Although the presence of an alkali is unnecessary to accomplish the dispersion, we have found that a finished product of superior flavor can be obtained by the addition of a small amount of lime to the casein-milk mixture prior to pasteurization. The addition of the lime, in accordance with the method presently to be described, establishes an optimum mineral dietary property of the product by providing a ratio of calcium to phosphorus that is generally regarded as highly desirable for dietary purposes.

As an illustration of the manner in which the present invention may be practiced, 100 pounds of high milk protein product are prepared by concentrating, in a conventional sanitary-type evaporator, 657 pounds of fresh skim milk to about 45% total solids. The degree of concentration is not critical except that it should not be carried to a point at which the lactose in the milk will crystallize. As previously stated, the pre-concentration of the skim milk substantially reduces bacterial growth and avoids the otherwise cumbersome operations involved in refrigerating and treating large volumes of the casein skim milk mixture. It is for this purpose that the pre-concentration of the skim milk is accomplished and, as above stated, a suitable concentration of about 45% total solids has been found to be effective in commercial operations.

The manufacture of the 100 pounds of high milk protein product is further carried out by wet milling or grinding 96.6 pounds of freshly precipitated casein curd which has been pressed to a solids content of about 47%. This milling or grinding is accomplished by using water as a lubricant and in a sufficient amount to yield a milled casein dispersion of about 15% total solids. A satisfactory casein for use in practicing the present invention is a casein described in terms of a dry product as having a maximum moisture content of 10%; an ash content (phosphorus fixed) of 2½%; a maximum acidity (calculated as lactic acid) of 0.35%; and a minimum content of protein of 86.0%. The solids content of the casein slurry should not be above 20% total solids to permit most convenient handling. In concentrations greater than 20% total solids, the heavy consistency of the slurry is such as to cause difficulties in handling. At concentrations of less than 15% total solids content of the casein slurry, the bulk of the product and difficulty of handling and drying again increase, and as above stated, the optimum value of solids content of the milled casein slurry is of about 15% total solids.

In order to improve the flavor of the product by offsetting the effect of the acidity of the curd (and also to establish a convenient and proper level of calcium in the finished product as above mentioned), a sufficient quantity of lime of U. S. P. quality is added to the casein-milk mixture (or to the casein-water slurry) to assure a pH of the mixture (likewise reflected in the pH of the final dried product) of 6.0 to 6.2. As previously stated, the lime is not necessary for the resolution or redispersion of the casein in the skim milk, but is used to improve the flavor, as above mentioned.

The foregoing concentrated skim milk and the casein slurry are then mixed and agitated to effect complete colloidal suspension of the casein solids in the skim milk by taking advantage of the buffering action of the skim milk. Either during mixing, or subsequently, the pasteurization of the mixture is accomplished by elevating its temperature to 150° F. for 30 minutes.

After pasteurization, as above described, the casein-skim milk liquid product is cooled to 120° F., and then dried in a suitable drying mechanism, such as a conventional spray drying mechanism. Cooling of the liquid product to 120° F. enables it to be maintained in a fluid condition without danger of browning, and thus permitting the material to be held until it is introduced into the spray dryer or until it is dried by other suitable mechanism.

The optimum protein concentration of the final product is 60%, although the range of concentration may vary from 40 to 70%.

The composition of a typical product is as follows:

| | Per cent |
|---|---|
| Protein | 60.0 |
| Moisture | 4.0 |
| Lactose (milk sugar) | 27.5 |
| Ash | 5.7 |
| Calcium | 1.2 |
| Phosphorus | 1.1 |
| Sodium | 0.29 |
| Fat | 1.0 |

The optimum dietary relationship accomplished by the addition of lime, as above mentioned, is a significant factor in the ultimate product, inasmuch as casein is practically calcium-free and, therefore, the major portion of the calcium present, without the addition of lime, would be that present in the skim milk. A further important factor in the final product is its low sodium content which is in the order of about 0.29%, resulting from the fact that casein is substantially free from sodium and, therefore, its mixture with skim milk reduces the sodium content of the resulting mixture over the sodium content of skim milk. As a result, it is possible to give a cardiac or hypertension patient (i. e., one on a salt-restricted diet) of average weight (70 kilos) his daily requirement of protein (70 grams) without giving him more than 0.34 gram of sodium which is well within the usual sodium-restricted intake.

Ammonium hydroxide, or any other suitable alkali, could be used in place of or in addition to the lime for flavor purposes. In any event, the resulting product is of good taste and odor, and its white physical appearance is appealing. It is readily reconstitutable with water or milk without forming a granular or grainy appearance and without tending to settle out. Inasmuch as it is fat-free, it has good keeping qualities and with its high protein content, the product has high biological value. Moreover, the process of manufacturing the product, as above described, is economical and results in a product that can be reasonably priced and thus can be made available to a wider market than similar products that have heretofore been manufactured. These above noted features of the product lend considerable variety to the ways in which it may be used, either directly in kitchen prepared foods or indirectly in formulated pharmaceutical or commercially prepared dietary products for consumption by all age groups requiring protein supplementation of the diet.

We claim:

1. A method of preparing a whole protein product which is dispersible in aqueous liquids, comprising finely dividing the particle size of a casein curd in water to not over twenty per cent (20%) total solids, preparing a mixture consisting of the casein curd, water and skim milk, adding sufficient lime (U. S. P. quality) to adjust the pH of the mix to between 6.0 and 6.2, dispersing the casein curd therein by pasteurizing, and drying.

2. A method of preparing a whole protein product which is dispersible in aqueous liquids, comprising finely dividing the particle size of a casein curd in water to not over twenty per cent (20%) total solids, concentrating skim milk, preparing a mixture consisting of the casein and the concentrated skim milk, adding sufficient lime (U. S. P. quality) to the mix to adjust the pH value thereof to from 6.0 to 6.2, dispersing the casein curd therein by pasteurizing, and drying.

3. A method of preparing a whole protein product which is dispersible in aqueous liquids, comprising finely dividing the particle size of a casein curd in water to about fifteen per cent (15%) total solids, concentrating skim milk to a concentration of about forty-five per cent (45%) total solids, preparing a mixture consisting of the casein and the concentrated skim milk, dispersing the casein curd therein by pasteurizing, and drying.

4. A method of preparing a whole protein product which is dispersible in aqueous liquids, comprising finely dividing the particle size of a casein curd in water to about fifteen per cent (15%) total solids, concentrating skim milk to a concentration of about forty-five per cent (45%) total solids, preparing a mixture consisting of the casein and the concentrated skim milk, adding lime to adjust the pH of the mix to from 6.0 to 6.2, dispersing the casein curd therein by pasteurizing, and drying.

5. A method of preparing a whole protein product which is dispersible in aqueous liquids, comprising finely dividing the particle size of a casein curd in water to about fifteen per cent (15%) total solids, concentrating skim milk to a concentration of about forty-five per cent (45%) total solids, preparing a mixture consisting of the casein and the concentrated skim milk, adding lime to adjust the pH of the mix to from 6.0 to 6.2, dispersing the casein curd therein by heating and agitating at about 150° F. for 30 minutes, and drying.

6. A method of preparing a whole protein product which is dispersible in aqueous liquids, comprising finely dividing the particle size of a casein curd in water to about fifteen per cent (15%) total solids, concentrating skim milk to a concentration of about forty-five per cent (45%) total solids, preparing a mixture consisting of the casein and the concentrated skim milk, adding lime to adjust the pH of the mix to from 6.0 to 6.2, dispersing the casein curd therein by heating and agitating at about 150° F. for 30 minutes, cooling to 120° F., and drying.

7. A method of utilizing the buffering capacity of skim milk in a chemico-physico reaction to prepare a high protein milk product which includes the steps of reducing the particle size of an acidic casein curd which is difficultly dispersible in water, preparing a mixture consisting of the casein curd and fresh skim milk, agitating the skim milk-casein curd mixture with sufficient heating to disperse the casein in the milk with the aid of the alkaline buffering capacity of the milk, reducing the pH of the milk to within the range from 5.6 to 6.2, and producing a stable colloidal dispersion, and adding an alkali in an amount sufficient to maintain the pH of the dispersion within the range from 6.0 to 6.2 and to improve flavor but insufficient to disperse the casein.

8. A method in accordance with claim 7 in which the milk is a concentrated skim milk having a solids content of at least 20%.

9. A method in accordance with claim 7 in which the alkali is lime.

10. A method in accordance with claim 7 in which the heating is at a temperature and for a time sufficient to pasteurize the mixture.

11. A method in accordance with claim 7 which includes drying the finished dispersion.

References Cited in the file of this patent

UNITED STATES PATENTS

| Number | Name | Date |
|---|---|---|
| 1,302,486 | Dunham | Apr. 29, 1919 |
| 1,341,040 | Bosworth | May 25, 1920 |
| 1,491,166 | Peebles | Apr. 22, 1924 |
| 1,962,552 | Dahlberg | June 12, 1934 |
| 2,098,765 | Sharpless | Nov. 9, 1937 |
| 2,142,093 | Clickner | Jan. 3, 1939 |
| 2,225,506 | Otting | Dec. 17, 1940 |
| 2,279,205 | Parsons et al. | Apr. 7, 1942 |
| 2,326,132 | Fear | Aug. 10, 1943 |